United States Patent
Liu et al.

(10) Patent No.: US 11,966,867 B2
(45) Date of Patent: Apr. 23, 2024

(54) PROJECT MANAGEMENT VISUALIZATION INTERFACE

(71) Applicants: MICRO FOCUS LLC, Santa Clara, CA (US); Hai-Ying Liu, Shanghai (CN); Chen Ding, Shanghai (CN); Jing-Chun Xia, Shanghai (CN)

(72) Inventors: Hai-Ying Liu, Shanghai (CN); Chen Ding, Shanghai (CN); Jing-Chun Xia, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 381 days.

(21) Appl. No.: 17/312,269

(22) PCT Filed: Dec. 13, 2018

(86) PCT No.: PCT/CN2018/120967
§ 371 (c)(1),
(2) Date: Jun. 9, 2021

(87) PCT Pub. No.: WO2020/118638
PCT Pub. Date: Jun. 18, 2020

(65) Prior Publication Data
US 2022/0036267 A1 Feb. 3, 2022

(51) Int. Cl.
*G06T 11/20* (2006.01)
*G06Q 10/0631* (2023.01)

(52) U.S. Cl.
CPC ...... *G06Q 10/06313* (2013.01); *G06T 11/206* (2013.01)

(58) Field of Classification Search
CPC .................................................. G06T 11/206
See application file for complete search history.

(56) References Cited

U.S. PATENT DOCUMENTS

| 7,734,491 B2 | 6/2010 | Kayahara et al. |
| 8,407,078 B1 | 3/2013 | Caputo et al. |

(Continued)

FOREIGN PATENT DOCUMENTS

| CN | 102819982 A | 12/2012 |
| CN | 108038915 A | 5/2018 |
| WO | WO-WO2012162263 A2 | 11/2012 |

OTHER PUBLICATIONS

"Plan and manage your projects a smarter way," ArKit, May 2018, 7 pages [retrieved online from: www.arkit.io/project-management].

(Continued)

*Primary Examiner* — Samantha (Yuehan) Wang
(74) *Attorney, Agent, or Firm* — Sheridan Ross P.C.

(57) ABSTRACT

A technique includes displaying, by a computer using a graphical interface, a map of a geographical area, where the map includes political boundaries. The technique includes displaying, by the computer, graphical images on the map representing a plurality of aspects that are associated with the management of a plurality of projects as corresponding geographical features on the map. The technique includes graphically segregating, by the computer, the plurality of projects on the map using the political boundaries; receiving input, via interaction with the displayed map; and changing, by the computer, in response to the interaction, how a given aspect of the plurality of aspects of a given project of the plurality of projects is represented on the map.

20 Claims, 5 Drawing Sheets

(56) References Cited

U.S. PATENT DOCUMENTS

| | | |
|---|---|---|
| 8,738,414 B1 | 5/2014 | Nagar et al. |
| 9,058,579 B2 | 6/2015 | Simpson et al. |
| 2009/0210277 A1 | 8/2009 | Hardin et al. |
| 2012/0263154 A1* | 10/2012 | Blanchflower ....... G06T 19/006 455/414.1 |
| 2015/0161969 A1 | 6/2015 | Zaizen |
| 2015/0234477 A1* | 8/2015 | Abovitz .............. G06F 3/04883 382/103 |
| 2017/0316528 A1 | 11/2017 | Willcox et al. |
| 2018/0335308 A1* | 11/2018 | Zavesky ............ G01C 21/3676 |

OTHER PUBLICATIONS

"Visualize your data on a custom map using Google My Maps," Google, retrieved May 16, 2018, 21 pages [retrieved online from: www.google.com/earth/outreach/learn/visualize-your-data-on-a-custom-map-using-google-my-maps/].

International Search Report/Written Opinion; PCT/CN2018/120967; dated Aug. 27, 2019; 9 pages.

International Search Report and Written Opinion prepared by the ISA/CN dated Aug. 15, 2019, for International Application No. PCT/CN2018/120967.

\* cited by examiner

PROJECT MANAGEMENT VISUALIZATION INTERFACE

CROSS-REFERENCE TO RELATED APPLICATIONS

This application is a national stage application under 35 U.S.C. 371 and claims the benefit of PCT Application No. PCT/CN2018/120967 having an international filing date of 13 Dec. 2018, which designated the United States, the entire contents of which are incorporated herein by reference.

BACKGROUND

For purposes of producing a product in a time and cost efficient manner and ensuring that the product meets design goals, a business organization may use project management software to manage all aspects of the product's lifecycle. In this manner, employees of the organization may use product management software to initially plan a product, identify potential problems associated with the development of the product, predict costs associated with the project, evaluate and reassess team member assignments to aspects of the project, predict time lines for meeting product design metrics, and so forth.

DETAILED DESCRIPTION

Figure 1:
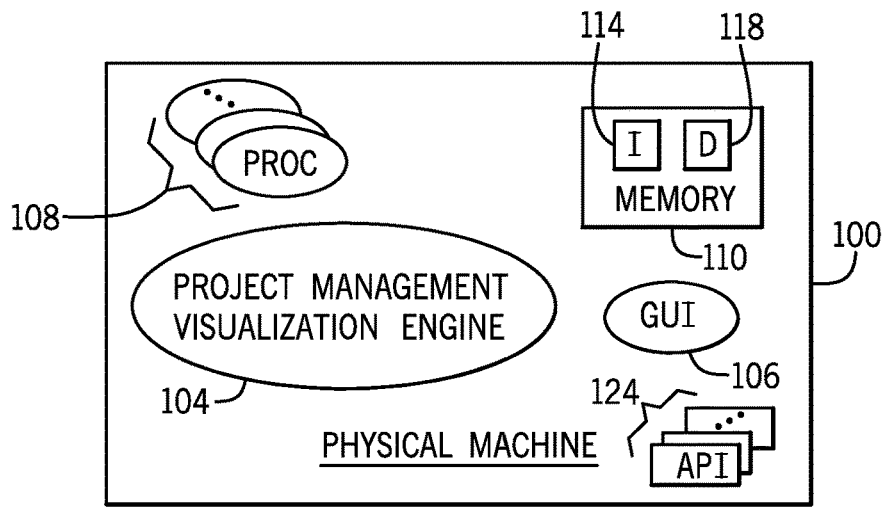
FIG. 1 is a schematic diagram of a physical machine containing a project management visualization engine according to an example implementation.

Project management software may be used to manage aspects of a product's lifecycle, and for this purpose, the project management software may provide a graphical user interface (GUI). Through interaction with the GUI, the user may select a particular project, select different reports detail aspects of the project, and in general, manage various aspects of the product's lifecycle. As a more specific example, a user may provide input (via mouse clicks and movements, for example) to the GUI to select a particular project, and the GUI may then display various menu options for viewing the progress and managing the selected project, such as menu options for entry costs associated with the project, viewing a projection of costs for the project, viewing progress reports, viewing and editing of team member assignments, viewing test results, and so forth. The project management GUI may be rather limited in its ability to allow the user to visualize multiple products concurrently in a manner that allows the user to grasp the states of several ongoing projects and control various aspects of these projects.

In accordance with example implementations that are described herein, a project management visualization engine provides a GUI that displays a global project map, which has features that allow the concurrent viewing, or visualization, of multiple projects. More specifically, in accordance with example implementations, the global project map may be a political map in that political boundaries (state boundaries, country boundaries, county boundaries, and so forth) are displayed on the map. As described herein, the political boundaries may be used to segregate different projects.

For example, in accordance with some implementations, the GUI may visually segregate, or group, projects that are associated with different classes, or categories, using the country boundaries of the political map. In this regard, a business organization may be developing and/or supporting products that may be segregated, or grouped, into different product categories, or classifications. As a more specific example, a business organization may be developing and/or supporting big data searching products (i.e., products related to searching large volumes of structured and/or unstructured data); these big data searching products may be associated with a first class, or category; and the GUI may visually associate these big data searching data products on the political map of the GUI within the map region that is circumscribed by the political boundaries of Country A. Continuing the example, the business organization may be developing and/or supporting database management search engine products; there database management search engine products may be associated with a second class, or category; and the GUI may visually associate these database management search engine products on the political map of the GUI within the map region that is circumscribed by the political boundaries of Country B.

In accordance with example implementations, the GUI may use the map regions corresponding to the countries as corresponding menu option selectors that are used to select product classes. As such, on a relatively coarse scale, the user may, through the GUI, select (via mouse movements and/or mouse clicks, for example) a particular country region on the political map to further drill down, or investigate, the particular products associated with the selected product class (i.e., the products displayed within the political boundaries of a particular country).

In accordance with example implementations, the user selection of a particular county on the GUI's political map causes the GUI to display a magnified, or "zoomed-in" view of the country, which allows the user to further navigate to specific products with the selected class. In accordance with example implementations, with each country, GUI may further visually segregate the projects within a particular product class according to domains. For example, for the example set forth above for the big data search engine product line (associated with Country A), this product line may be grouped into different domains, depending on the particular industry and/or target country of use for the project. In accordance with example implementations, the GUI visually segregates the domains for a product class according to states. In this manner, in accordance with example implementations, when the user selects a country on the political map, the GUI zooms in on the selected country to display states that are associated with the country; and the map region circumscribed by each state, in turn, serves as a menu option selector to select products of a particular domain.

As a more specific example, the domains may correspond to different industry class, so that different states within a country may serve as menu option selectors for different industries within the same product class. For example, in Country A, State A may correspond to the big data search engine product line, as tailored to the pharmaceutical industry, whereas State B may correspond to the big data search engine being tailored for the oil and gas industry. As such, by selecting a particular state by selecting a region of the displayed political map circumscribed by the state's boundaries, a user may select a particular product line that is associated with a particular class and a particular domain.

In accordance with example implementations, in addition to visually segregating projects according to categories and/or domains using the project map, in accordance with example implementations, the GUI visually segregates projects by urban areas (cities or towns, for example) of the political map. In this manner, in accordance with example implementations, a particular project may be represented by a particular city on the political map, such that the depicted geographical features (buildings, parks, universities, roads, and so forth) within the city may represent particular project management attributes of the project.

As a more specific example, a particular project may be a software product, and the GUI may be used to manage various aspects of the software products' lifecycle. Structures, or buildings, within the city may represent, for example, defects (errors, or "bugs," identified through product testing, consumer feedback, and so forth) in the software product, and the spatial density of the buildings may represent a defect density that is associated with the software product. Moreover, particular areas, or zones, which are depicted on the map within the city may represent the results, coverage, and so forth, of tests that have been performed on the software product and, for example, the coverage of tests to be performed on the software product. Continuing the example, roads and highways within the city may, for example, be used to visualize relationships among different aspects of the software product, such as, for example, the relationships among identified defects of the software product.

Thus, in accordance with example implementations, a user may navigate the political map that is provided by the GUI to select a particular country and state of the political map that is displayed by the GUI to select a corresponding product class and domain; and due to these selections, the GUI displays a enlarged view of the selected state. For this map of the selected state, the user may, for example, interact with the GUI to pan the displayed view over cities or other urban areas, which each graphically depict aspects of the products that correspond to these urban areas.

As a more specific example, FIG. 1 depicts a schematic diagram of a physical machine 100 that has a GUI 106 that, as described herein, allows a user to visualize multiple ongoing products concurrently in a manner that allows the user to determine the states of these projects and control various aspects of these projects. The physical machine 100 is an actual machine that is made up of machine executable instructions (or "software") and actual hardware. Depending on the particular implementation, the physical machine 100 may be, as examples, a private machine owned by a business organization. In this manner, the physical machine 100 may, for example, execute machine executable instructions to provide the GUI 106. In further example implementations, the physical machine 100 may be a server, and the GUI 106 may be accessed via a client machine that communicates with the server. In accordance with yet further example implementations, the physical machine 100 may be part of a cloud computer system, and the GUI 106 may be accessed via a remote computer by a tenant (or user associated with the tenant) who subscribes to a cloud service affiliated with the GUI 106. Such a cloud computer system may be a private cloud computer system, a public cloud computer system or a hybrid cloud computer system (i.e., a mixture of public and private cloud computer systems). Although the physical machine 100 is an actual machine made up of actual software and hardware, the physical machine 100 may include one or multiple virtual machines to provide the GUI 106 and the project management visualization that is described herein. Moreover although FIG. 1 depicts the physical machine 100 as being contained in a box (or rack), the physical machine 100 may be contained in multiple boxes (or racks); and in accordance with some implementations, the physical machine 100 may be formed from multiple networked computers that may be disposed at the same geographical location or may be disposed at multiple geographical locations. As such, many implementations of the physical machine 100 are contemplated, which are within the scope of the appended claims.

In accordance with example implementations, the physical machine 100 includes a project management visualization engine 104, which may provide the GUI 106. In accordance with example implementations, the project management visualization engine 104 may be formed by one or multiple physical hardware processors 108 (one or multiple central processing units (CPUs), one or multiple CPU cores, and so forth), executing machine executable instructions 114 (i.e., "software"). Moreover, the instructions 114 may be stored, for example, in a memory 110 of the physical machine 100. In general, the memory 110 is a non-transitory memory that may be formed from, as examples, semiconductor storage devices, phase change storage devices, magnetic storage devices, memristor-based devices, a combination of storage devices associated with multiple storage technologies, and so forth.

The physical machine 100 may contain other hardware, such as, for example, one or multiple display devices 109 (a monitor, for example), to display the images representing the visual output of the GUI 106 and one or multiple input devices 107 (a mouse, a keyboard, a touchpad, a touch screen sensor, and so forth), which provide input to the GUI 106.

In accordance with some implementations, the memory 110 may store instructions 114, which may be executed by the processor(s) 108 to form one or multiple components of the project management visualization engine 104. Moreover, the memory 110 may store various data (data describing project maps provided by the GUI 106, data describing user input received to control the visualization of the project maps, data representing project categories, data representing project domains, data representing project aspects, data representing product defects, data representing geographical features of the project maps representing aspects of projects, data representing product test results, and so forth).

In accordance with some implementations, the project management visualization engine 104 may be implemented in whole or in part by a hardware processor circuit that does not execute machine executable instructions. For example, in accordance with some implementations, the project management visualization engine 104 may be formed in whole or in part by a processor that does not execute machine executable instructions, such as, for example, an application specific integrated circuit (ASIC), a field programmable gate array (FPGA), and so forth. Thus, many implementations of a processor are contemplated, which are within the scope of the appended claims.

In accordance with example implementations, the global project map, including the different views associated with the map (e.g., zoomed-in views, zoomed-out views, views of different countries, the views of different states, the views of different urban areas, and so forth) may be provided using one or multiple application programming interfaces (APIs) 124. For example, in accordance with some implementations, the map images produced for the GUI 106 may be provided by a map vendor, and the map vendor may be associated with one or multiple APIs 124 that are called, or invoked, for purposes of invoking the map services that are provided by the map vendor (i.e., the API calls are used to display map images). Using such an approach may have certain advantages, in accordance with example implementations, as the resource requirements may be relaxed (i.e., a relatively less powerful processor 108 may be used, less memory space is consumed and so forth). In accordance with further example implementations, the project management visualization engine 104 may not execute API calls to invoke services provided by a map vendor and may instead generate the map images. Thus, many implementations are contemplated, which are within the scope of the appended claims.

Figure 2:
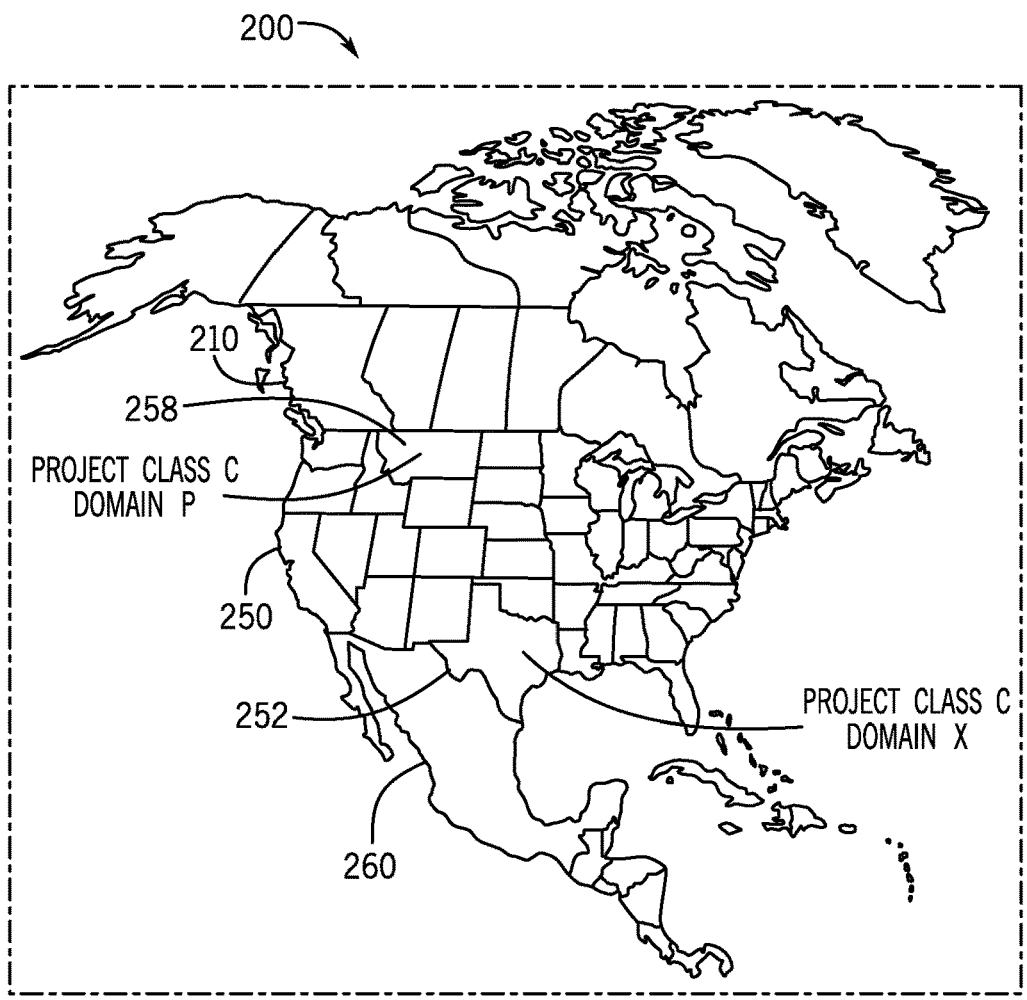
FIGS. 2 and 3 depict political map-based visualizations of projects according to example implementations.

FIG. 2 depicts a graphical output image 200 that is provided by the GUI 106 of FIG. 1 in accordance with example implementations. In particular, the graphic image 200 is a visualization of a political map (herein called the "the project map") at a relatively higher, or coarser level, which is a global view of multiple ongoing projects that may be managed using the GUI 106. It is noted that the user that is interacting with the GUI 106 to cause the GUI 106 to display the image 106 may have a certain role within an enterprise (a manager for a particular product or product line, for example), and the information that is displayed by the GUI 106 as well as the ability to enter input or make changes is controlled by the GUI 106 based on access privileges that are associated with this role or user.

For the example that is depicted in FIG. 2, the graphical output image 200 is a map of North America, with the political boundaries of the United States representing a certain class, or category, of projects, such that by a user selecting (via a mouse clicks and/or movements, or screen touches (for a touch screen display)), the region inside these boundaries the user may cause the GUI 106 to expand the displayed map region corresponding to the United States to further navigate to specific projects. Moreover, for this example, the state boundaries within the United States represent different domains for projects. For example, political boundaries 252 of Texas may represent aspects of projects of Class C of Domain X; and as another example, the political boundary 258 of Montana corresponds to the Class C projects associated with Domain P. It is noted that the user may, through the input devices 107, select other countries (such as Canada 210 and Mexico 260) representing a visual segregation of products according to other classes, as well as navigate to other continent and country views to select yet other product classes.

By interacting with the GUI 106 through input device(s) 107 (FIG. 1) of the physical machine 100, the user may select the projects associated with a particular class and domain. For example, the user may position a mouse pointer (not shown) within the political boundary 258 of Montana and left click on the mouse to select the state of Montana and correspondingly cause the GUI 106 to provide a zoomed in view of the state of Montana, illustrating, for example, cities and towns within Montana, and these cities and towns, in turn, may be individually associated with the projects associated with Class C and Domain P. Through further interaction of the user with the GUI 106 through input device(s) 107, the project management visualization engine 104 may display further and different views of the project map. For example, through interaction with the GUI 106 via the input device(s) 107, the user may provide input that causes the GUI 106 to pan to a different area of the currently displayed map, zoom in or out of a particular region, and so forth.

Figure 3:
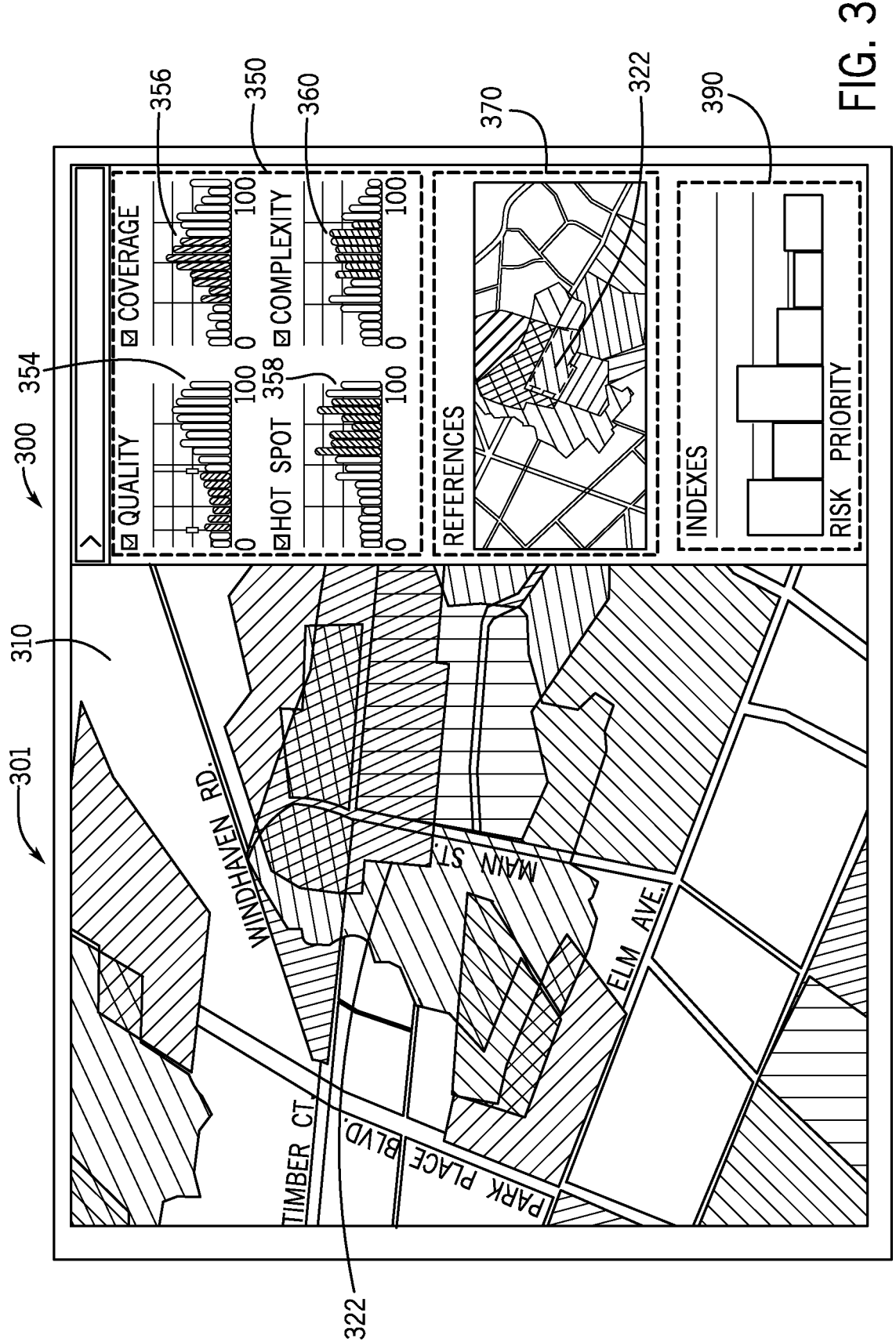

Referring to FIG. 3 in conjunction with FIG. 1, in accordance with example implementations, the GUI 106 may provide a view localized within a city (i.e., provide a view representing aspects of a particular project, as representing by the depicted geographical features. In this manner, FIG. 3 depicts an example graphical output 300 of the GUI 106 in accordance with some implementations. As shown, the graphical output 300 includes a region 310 of the global map within a particular city (and accordingly, associated with a particular project). In accordance with example implementations, the GUI 106 may display transparent and potentially overlapping layers to further represent aspects of the project. In FIG. 3, these layers are represented by different cross-hatched layers, where each cross-hatched pattern may correspond to a different color (and different aspect of the project).

For the specific example of FIG. 3, the graphical output 300 contains a window 301, which depicts layers and geographical features, which all represent test results for a software product. A particular geographical feature, such as a building 322, may represent a defect in a software project. The layers inside the window 301 represent different aspects of product test results, such as an overall quality, a test coverage, a hotspot indication (i.e., a priority, such as whether immediate attention is associated with the region 320-1), and a complexity. Window 350 contains sub-windows 354, 356, 358 and 360, which correspond to interactive histograms for quality, coverage, hot spot, and complexity, respectively, which correspond to the layers that are displayed in the window 301 and allow a user to adjust the range (0 to 100) of the indices for these histograms. Window 390 allows the selection of the specific indices for the histograms of sub-windows 350, 356, 358 and 360. For example, the user may adjust the quality histogram 354 to a range between ten and fifty percent so that the corresponding quality layer that is displayed in window 301 corresponds to that range. A user interactive references window 370 allows the user to select the region around building 322 (the software defect) or select other regions (corresponding to other software defects, for example).

Figure 4:
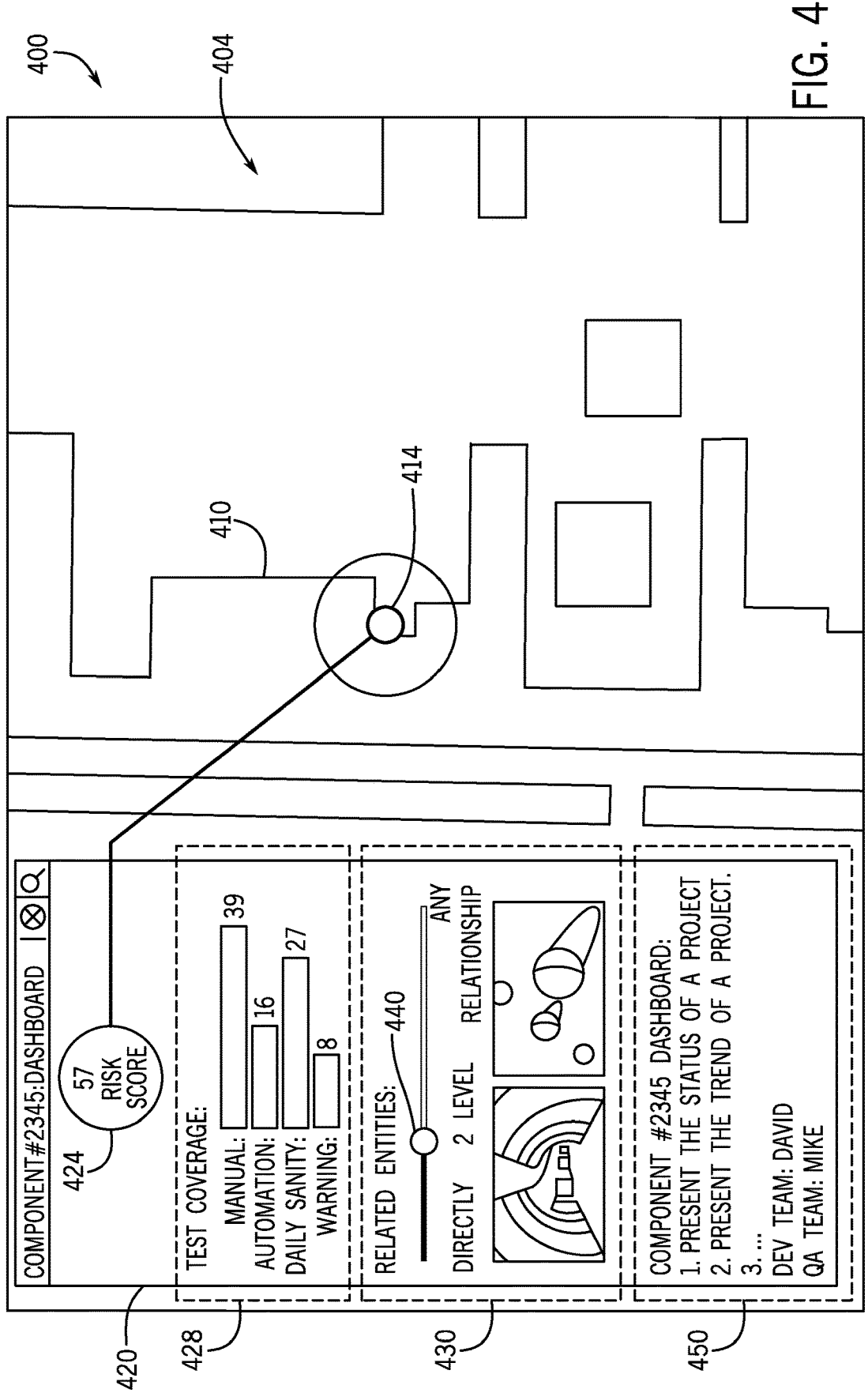
FIG. 4 is an illustration of a point of view visualization of a project according to an example implementation.

Referring to FIG. 4, in accordance with some implementations, a user, which as associated with a particular role in the project may select (via a left mouse button click with the cursor being positioned on a specific point in window 301 of FIG. 3, for example) a particular region of the project for a point of interest (POI) view, which is depicted by an example POI graphical output 400 in FIG. 4. The POI graphical output 400, in general, depicts aspects of the project relevant to the user's point of view, such as, for this example, aspects related to a specific POI 414 displayed in a map view window 404. For example, as illustrated in FIG. 4, the POI graphical output 400 may present a dashboard 420 that represents various aspects of the POI 414, such as a risk score 424 (here, a risk score of "57"), a window 428 representing various aspects of a test coverage associated with the POI 414, a window 430 depicting information pertaining to entities related to the POI 414 (as controlled by a related entity slide bar 440 in the window 430), and a window 450 containing information pertaining to status and trends of the project from the standpoint of the role of the user. As depicted in the window 450, the status and trends of the project may include members of the development team, members of the corresponding quality assurance team, agenda items for the project, and so forth.

Figure 5:
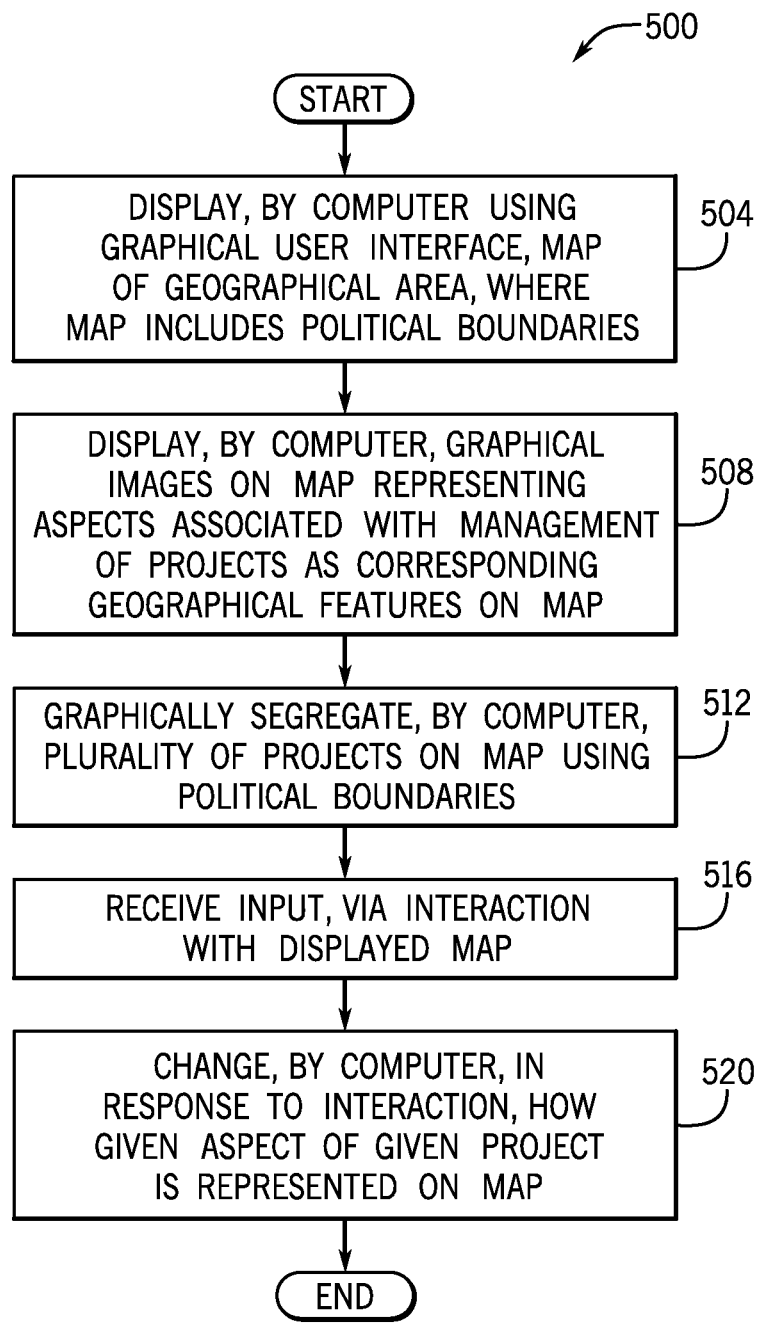
FIG. 5 is a flow diagram depicting a technique to visualize a plurality of projects using a map that includes political boundaries according to an example implementation.

Referring to FIG. 5, in accordance with example implementations, a technique 500 includes displaying (block 504), by a computer using a graphical user interface, a map of a geographical area, where the map includes political boundaries; and displaying (block 508), by the computer, graphical images on the map representing a plurality of aspects associated with the management of a plurality of projects as corresponding geographical features on the map. The technique includes graphically segregating (block 512) by the computer, the plurality of projects on the map using the political boundaries; and receiving (block 516) input, via interaction with the displayed map. The technique 500 includes changing (block 520) by the computer, in response to the interaction, how a given aspect of the plurality of aspects of a given project of the plurality of projects is represented on the map.

Figure 6:
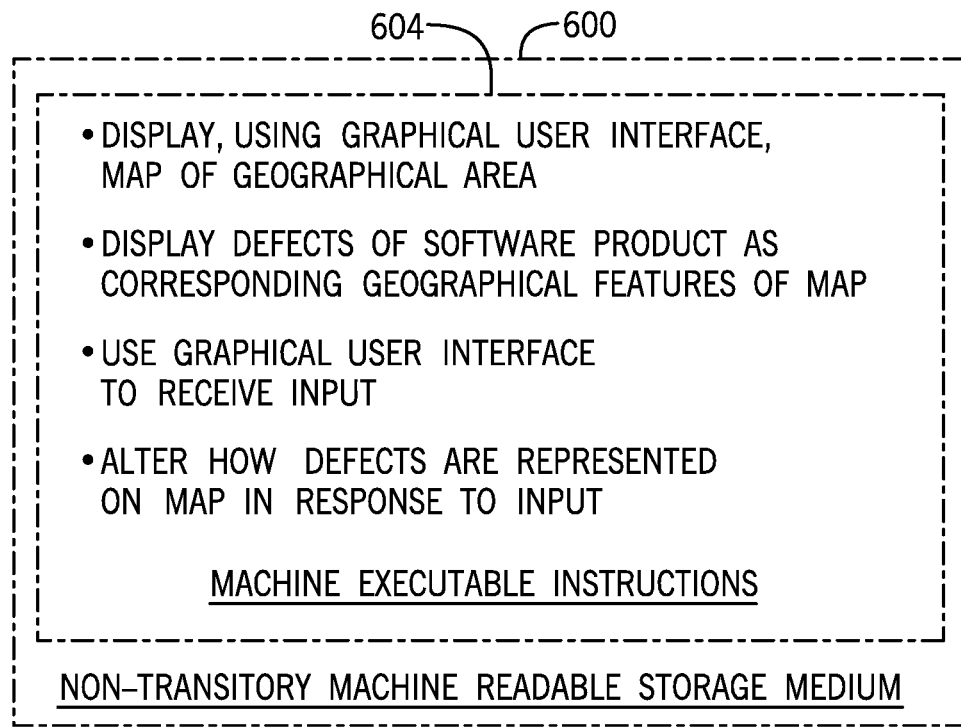
FIG. 6 is an illustration of machine executable instructions stored on a non-transitory machine readable storage medium to, when executed by a machine, cause the machine to visualize defects of a software product as corresponding geographical features of a map according to an example implementation.

Referring to FIG. 6, in accordance with example implementations, a non-transitory computer readable storage medium 600 stores instructions 604 that, when executed by at least one processor, cause the processor(s) to display, using a graphical user interface, a map of a geographical area; and display defects of a software project to corresponding geographical features of the map. The instructions 604, when executed by the processor(s), cause the processor(s) to use the graphical user interface to receive input; and alter how the defects are represented on the map in response to the input.

Figure 7:
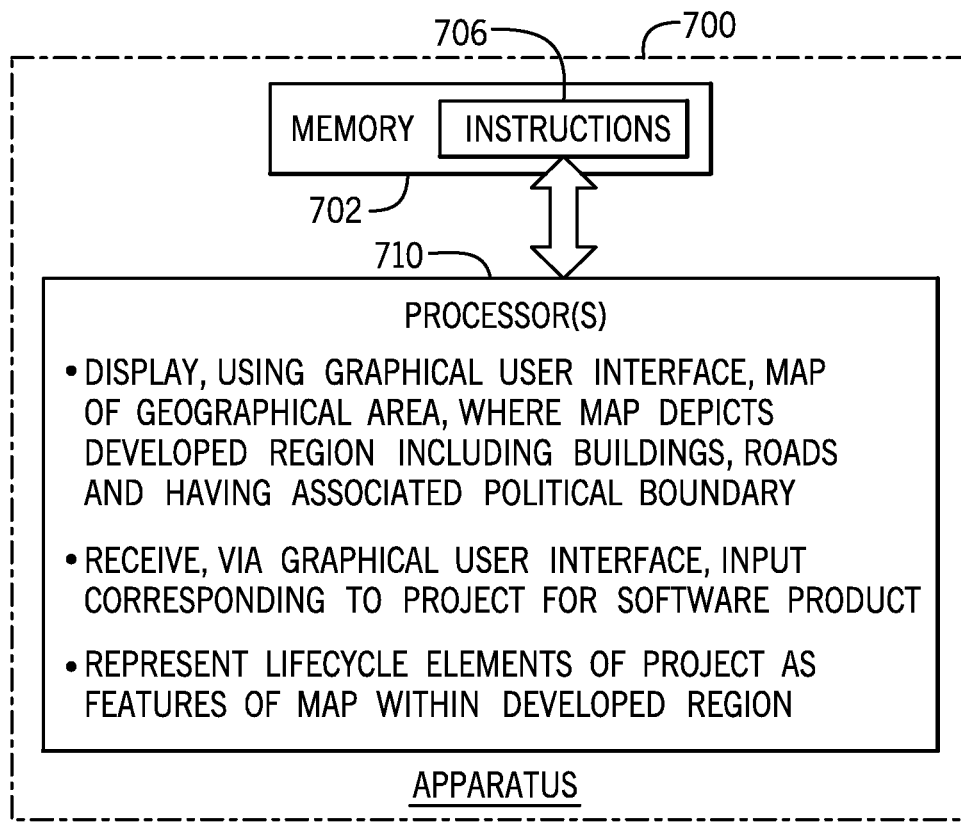
FIG. 7 is a schematic diagram of an apparatus to represent lifecycle elements of a project as features on a political map according to an example implementation.

Referring to FIG. 7, in accordance with example implementations, an apparatus 700 includes at least one processor 710 and a memory 708 to store instructions 706 that, when executed by the processor(s) 710, cause the processor(s) 710 to display, using a graphical user interface, a map of a geographical area. The map depicts a developed region including building, roads and has an associated political boundary. The instructions 706, when executed by the processor(s), cause the processor(s) 710 to receive, via the graphical user interface, input corresponding to a project for a software product and represent lifecycle elements of the project as features of the map within the developed region.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method, comprising:
    displaying, by a computer using a graphical user interface, a map of a geographical area, wherein the map includes political boundaries;
    displaying, by the computer, graphical images on the map representing a plurality of aspects associated with management of a plurality of projects as corresponding geographical features on the map;
    graphically segregating, by the computer, the plurality of projects on the map using the political boundaries;
    displaying, by the computer, different layers that overlap the map of the geographic area to represent different test results for a software product including one or more test results of quality, coverage, priority, or complexity;
    receiving input, via interaction with the displayed map; and
    changing, by the computer, in response to the interaction with the displayed map, how a given aspect of the plurality of aspects of a given project of the plurality of projects is represented on the map.

2. The method of claim 1, wherein changing how a given aspect is represented on the map comprises changing a focus of a selected portion of the map to emphasize or deemphasize a given aspect of the plurality of aspects.

3. The method of claim 1, wherein changing how a given aspect is represented on the map comprises displaying a point of view associated with a selected portion of the map and associated with a user role.

4. The method of claim 1, wherein a given project of the plurality of projects is associated with lifecycle management of the software product.

5. The method of claim 1, wherein the corresponding geographical features for the plurality of aspects associated with the management of the plurality of projects comprise a plurality of defects associated with the software product.

6. The method of claim 1, wherein a geographical density of geographical features of the map graphically represents a defect density associated with the software product.

7. The method of claim 6, wherein:
    the map displays a plurality of urban zone boundaries; and
    different tests for the software product are demarcated by the urban zone boundaries such that a region of the map designated by a given urban zone boundary corresponds to a defect density identified by a given test.

8. The method of claim 1, wherein the geographical features comprise buildings.

9. The method of claim 1, wherein:
    the map includes roads; and
    the roads represent relationships between at least some of the aspects associated with a given project of the plurality of projects.

10. A non-transitory computer readable storage medium that stores instructions that, when executed by at least one processor, cause the at least one processor to:
    display, using a graphical user interface, a map of a geographical area;
    display a plurality of defects of a software product as corresponding geographical features of the map;
    display overlapping layers on the map representing different test results for the software product including one or more test results of quality, coverage, priority, or complexity;
    use the graphical user interface to receive input;
    alter how the plurality of defects and the overlapping layers are represented on the map in response to the input.

11. The storage medium of claim 10, wherein the instructions, when executed by the at least one processor, cause the at least one processor to import the map and overlay the geographical features corresponding to the plurality of defects on the imported map.

12. The storage medium of claim 10, wherein the instructions, when executed by the at least one processor, cause the at least one processor to create the map as a virtual map and overlay the geographical features corresponding to the plurality of defects on the virtual map.

13. An apparatus, comprising:
    at least one processor; and a memory to store instructions that, when executed by the at least one processor, cause the at least one processor to:
- display, using a graphical user interface, a map of a geographical area,
    wherein the map depicts a developed region comprising buildings, roads and having an associated political boundary;
- receive, via the graphical user interface, input corresponding to a project for a software product;
- display, by the graphical user interface, overlapping layers on the map of the graphical area representing different test results for the software product including one or more test results of quality, coverage, priority, or complexity; and
- represent lifecycle elements of the project as features of the map within the developed region.

14. The apparatus of claim 13, wherein:
the developed region comprise a city;
the map depicts another city; and
the instructions, when executed by the at least one processor, cause the at least one processor to represent lifecycle elements of another project as features of the map within the another city.

15. The apparatus of claim 14, wherein the projects are associated with a project domain in common, and the instructions, when executed by the at least one processor, cause the at least one processor to:
- display the cities on the map within a state to represent the projects with associated with the project domain; and
- display other cities associated with additional projects in other states on the map to represent the additional projects as being associated with other project domains.

16. The apparatus of claim 13, wherein the instructions, when executed by the at least one processor, cause the at least one processor to:
- display, using the graphical user interface, graphical images on the map representing a plurality of aspects associated with management of a plurality of projects as corresponding geographical features on the map, the plurality of projects comprising the project;
- graphically segregate the plurality of projects on the map using the associated political boundaries;
- receive input, via interaction with the displayed map; and
- change, in response to the interaction with the displayed map, how a given aspect of the plurality of aspects of a given project of the plurality of projects is represented on the map.

17. The apparatus of claim 16, wherein changing how a given aspect is represented on the map comprises changing a focus of a selected portion of the map to emphasize or deemphasize a given aspect of the plurality of aspects.

18. The apparatus of claim 16, wherein changing how a given aspect is represented on the map comprises displaying a point of view associated with a selected portion of the map and associated with a user role.

19. The apparatus of claim 16, wherein the plurality of aspects comprise a plurality of defects associated with the software product and wherein a geographical density of geographical features of the map graphically represents a defect density associated with the software product.

20. The apparatus of claim 19, wherein the instructions, when executed by the at least one processor, cause the at least one processor to:
- display a plurality of urban zone boundaries on the map, wherein different tests for the software product are demarcated by the urban zone boundaries such that a region of the map designated by a given urban zone boundary corresponds to a defect density identified by a given test.

* * * * *